F. N. BEYER AND J. H. LOUNGE.
APPARATUS FOR TREATING LIQUIDS.
APPLICATION FILED MAY 28, 1918.

1,378,314.

Patented May 17, 1921.
3 SHEETS—SHEET 1.

Witnesses:
Charles J. Cobb
B. Delaney

Inventors:
Frederick N. Beyer
John H. Lounge
by: Hiett Hill
Attys.

F. N. BEYER AND J. H. LOUNGE.
APPARATUS FOR TREATING LIQUIDS.
APPLICATION FILED MAY 28, 1918.

1,378,314.

Patented May 17, 1921.
3 SHEETS—SHEET 2.

Witnesses:

Inventors:
Frederick N. Beyer
John H. Lounge
by: _____
Attys.

F. N. BEYER AND J. H. LOUNGE.
APPARATUS FOR TREATING LIQUIDS.
APPLICATION FILED MAY 28, 1918.
1,378,314.
Patented May 17, 1921.
3 SHEETS—SHEET 3.
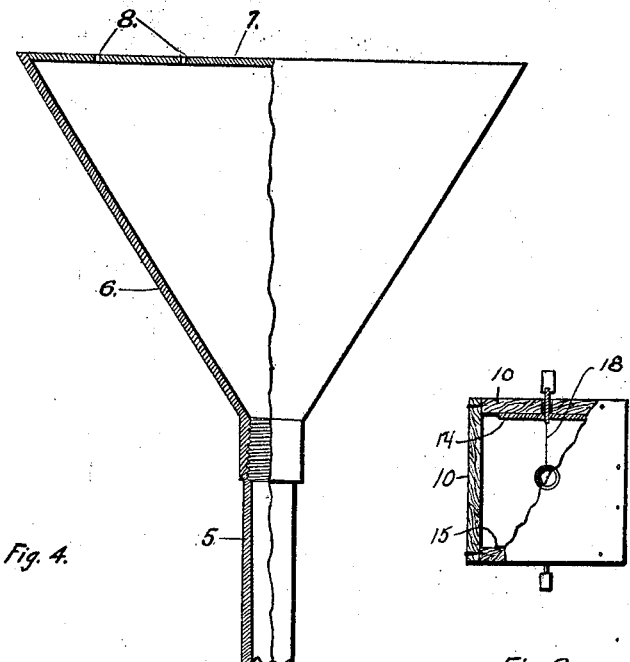
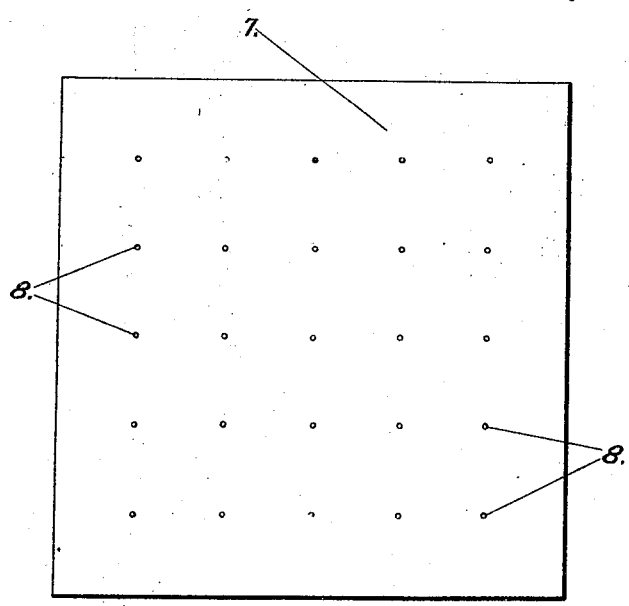
Witnesses:
Charles J. Cobb
B. Delaney
Inventors:
Frederick N. Beyer
John H Lounge
by
Attys.

UNITED STATES PATENT OFFICE.

FREDERICK N. BEYER AND JOHN H. LOUNGE, OF CHICAGO, ILLINOIS.

APPARATUS FOR TREATING LIQUIDS.

1,378,314.　　　　　Specification of Letters Patent.　　Patented May 17, 1921.

Application filed May 23, 1918. Serial No. 237,103.

*To all whom it may concern:*

Be it known that we, FREDERICK N. BEYER and JOHN H. LOUNGE, citizens of the United States, residing at Chicago, in the county of Cook and State of Illinois, have invented certain new and useful Improvements in Apparatus for Treating Liquids, of which the following is a description.

Our invention belongs to that general class of devices known as apparatus for treating liquids, together with the method of treating the liquids, and relates particularly to a method and apparatus for treating milk or the like so as to preserve the same. The invention has among its objects the production of a method and apparatus of the kind described that is simple, efficient, economical, convenient and satisfactory for use wherever found applicable. Many other objects and advantages of the method and apparatus herein shown and described will be obvious to those skilled in the art from the disclosure herein given.

To this end, our invention consists in the novel method, construction, arrangement and combination of parts herein shown and described and more particularly pointed out in the claims.

In the drawings, wherein like reference characters indicate like or corresponding parts, Figure 1 is a view in elevation of our improved apparatus, a portion being shown diagrammatically;

Fig. 4 is a sectional view through the sprayer;

Fig. 5 is a top elevation of the sprayer; and

Fig. 6 is a fragmentary sectional view taken substantially on line 6—6 of Fig. 2.

Figure 1:
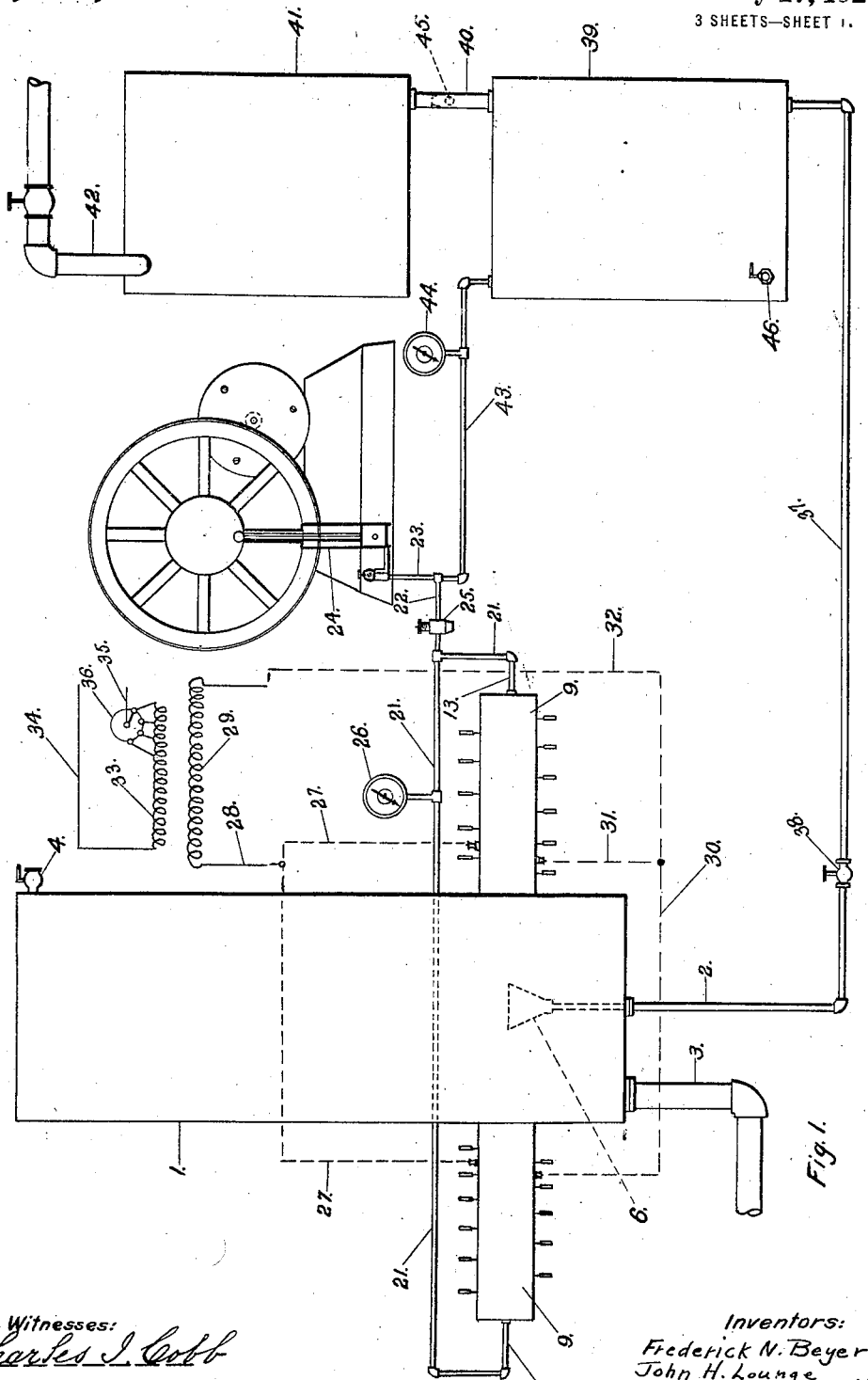
Figure 2:
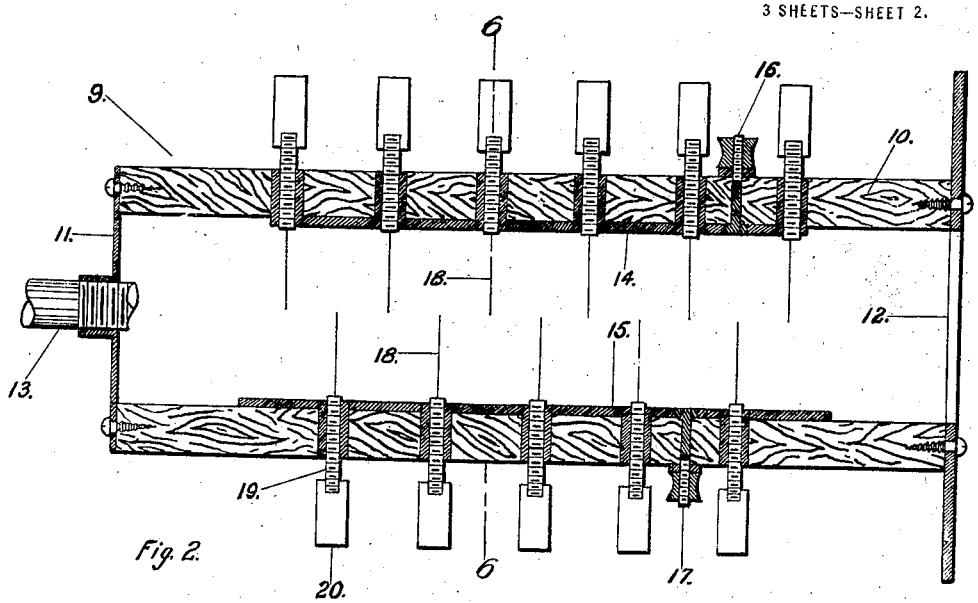
Fig. 2 is a sectional view through one of the ozonators.
Figure 3:
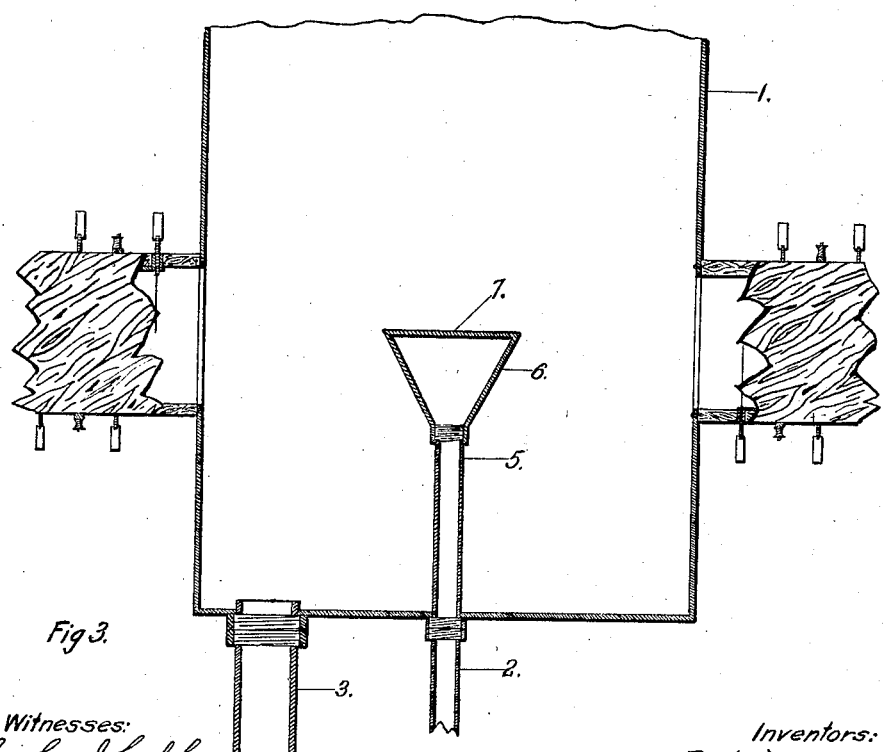
Fig. 3 is a sectional view through the treating tank.

Referring to the drawings, 1 represents a tank provided with an intake pipe 2 and a discharge pipe 3, the same being preferably arranged at the bottom, as shown in Figs. 1 and 3. The tank is also preferably provided with an air outlet at 4 having a suitable valve which may be shut as desired. Arranged on the interior of the tank 1 and connected with the intake pipe 2 is a pipe 5 which is provided with a sprayer 6, formed with a top 7, provided with holes or perforations 8 therethrough. The particular size, shape and design of the tank and sprayer, as well as the number of holes, may be as desired.

Arranged on the tank 1 are what may be termed ozonators 9, these consisting of suitable walls 10 at the sides, top and bottom, closed at the end 11, and positioned at the openings 12 in the side wall of the tank 1. Extending to each ozonator is an air pipe 13, through which air is admitted as will be hereafter described. Arranged within the ozonator and insulated from each other are plates 14 and 15, which are provided with binding posts 16 and 17, or their equivalents. Also arranged on the ozonator are conductors or plates 18. As shown, these are mounted on threaded members 19, arranged with controlling handles 20, the construction being such that the same may be adjusted as desired.

Air pipes 13 are connected by pipes 21, 22 and 23 with an air pump 24 of suitable design, or the equivalent for the purpose. We also prefer to provide a pressure regulator 25 and a gage 26, so that the desired air pressure may be maintained so as to control the circulation of air through the ozonators to produce the most efficient results. The binding posts 16 and 17 are connected with a high voltage transmission line, as shown by conductors 27, 28, 30, 31 and 32, with a transformer secondary 29. The transmission line 34—35 is connected with the primary 33, 36 being a rheostat so that the electrical discharge from the ozonator may be as desired.

Intake pipe 2 is connected by pipe 37 connected with a tank 39 containing untreated milk, under pressure, which is forced from the pipe 37 and intake pipe 2 into tank 1, 38 being a valve for controlling the passage of the same. The tank 39 is connected with a receiving tank 41 for untreated milk, which receives its supply from a feed pipe 42. As shown, tanks 39 and 41 are connected by pipe 40, it being understood that any equivalent construction may be employed. The compressor, or air pump, or source of supply of air 24 is connected to tank 39 by pipe 43, 44 being a pressure gage which is preferably employed. As most clearly shown in Fig. 1, we preferably place a check valve 45 in pipe 40 so that the contents of tank 41 can flow into tank 39, but not from 39 into 41.

In operation, milk is fed into tank 41, flows into tank 39 and is forced by the air pressure through pipe 37, past valve 38, through pipe 2, pipe 5, sprayer 6, out through the holes 8, the same breaking or spraying the milk into a very fine mist. At the same time air is forced through pipes 13, through ozonators 9, into the tank 1, into the milk mist or spray. The voltage of the line 34—35 may be as desired, ordinarily 110 volts, but the voltage of the lines 27, 30 and 31 from the secondary winding 29 to the transformer is ordinarily from 7,000 to 10,000 volts, this being controlled by the rheostat or regulator 36. The air from pipes 13 passing through the discharge between plates 14 and 15, and baffled back and forth, forms ozone, which enters into tank 1 where the milk or like fluid mist is, thereby ozonating the milk, which drops to the bottom of the tank and flows out through discharge pipe 3 to where desired. We have found from experiments that particularly satisfactory results may be obtained when the milk is thoroughly sprayed or broken up to form a mist, the same in this case being thoroughly impregnated or treated with the ozone. In so far as the action is concerned, the lactic acid germs in the milk are presumably killed and the milk keeps for a considerable number of days beyond the period during which it would ordinarily keep without treatment. While the apparatus is particularly intended for the treatment of milk, fruit juices and other liquids might be treated in the same manner so as to prevent the liquids from fermenting, becoming rancid or deteriorating.

Having thus described our invention, it is obvious that various immaterial modifications may be made in the same without departing from the spirit of our invention, hence we do not wish to be understood as limiting ourselves to the exact form, construction, arrangement and combination of parts herein shown and described or uses mentioned.

What we claim as new and desire to secure by Letters Patent is:

1. An apparatus of the kind described comprising the combination of a container provided with a fluid inlet, an outlet and an inlet independent of said fluid inlet for the admission of a preserving vapor, a tank connected with said fluid inlet, means on the interior of said container for spraying the liquid admitted through said fluid inlet from the tank and producing a mist, a second tank connected with said first mentioned tank, a feed pipe connected with said second tank, means for producing ozone in said container, and means for discharging the contents of the first tank into said container.

2. In an apparatus of the kind described and in combination, a receptacle, a fluid supply tank connected therewith, a receiving tank connected with said supply tank, means for spraying the liquid discharged into the receptacle, independent means for discharging ozone in said receptacle, a source of air under pressure connected with said supply tank, and with the means for discharging ozone into the receptacle, and for controlling the ozone discharged into the receptacle.

3. In an apparatus of the kind described and in combination, a treating receptacle, a liquid-containing tank, means for discharging said liquid into said receptacle under pressure, comprising means at said receptacle for breaking up said incoming fluid into a mist within said receptacle, means for producing and discharging ozone under pressure into said receptacle, whereby said ozone and mist commingle within said receptacle, and means for conveying the ozonated liquid from said receptacle.

4. In an apparatus of the kind described and in combination, a treating receptacle provided with a liquid inlet, a liquid-containing tank, means for discharging said liquid into said receptacle under pressure, comprising means at said receptacle for breaking up said incoming fluid into a finely divided mist within said receptacle, a second inlet in said receptacle, means for producing and discharging ozone under pressure into said receptacle at said secondary inlet, and means for conveying the ozonated liquid from said receptacle.

5. In an apparatus of the kind described and in combination, a treating receptacle provided with a liquid inlet, a liquid-containing tank, means for discharging said liquid into said receptacle under pressure through said liquid inlet, comprising means at said receptacle for breaking up said incoming fluid into a finely divided mist within said receptacle, a secondary inlet in said receptacle, means for ozonating said mist within said receptacle, comprising means for producing and discharging ozone under pressure through said secondary inlet, said ozone commingling with said mist, and means for conveying the ozonated liquid from said receptacle.

In testimony whereof, we have hereunto signed our names in the presence of two subscribing witnesses.

FREDERICK N. BEYER.
JOHN H. LOUNGE.

Witnesses:
ROY W. HILL,
CHARLES I. COBB.